UNITED STATES PATENT OFFICE.

MARIE CHARLES ALFRED RUFFIN, OF PARIS, FRANCE.

PROCESS OF REFINING COCOANUT-OIL.

SPECIFICATION forming part of Letters Patent No. 576,278, dated February 2, 1897.

Application filed February 7, 1896. Serial No. 578,398. (No specimens.)

*To all whom it may concern:*

Be it known that I, MARIE CHARLES ALFRED RUFFIN, of Paris, in the Republic of France, have invented a new Process of Purifying Cocoanut-Oil and its Edible Products, of which the following is a specification.

Numerous processes have been proposed for the purpose of deodorizing cocoanut-oil and oil of copra and rendering them edible, but what has always prevented cocoa-butter from being much used in domestic economy is its inconvenient quality of melting at a comparatively low temperature, (23° centigrade,) which renders such use of it almost impracticable, because of the difficulty of preserving it in a solid condition, above all in summer, and the consequent difficulty of transporting it. To remedy this inconvenience, I utilize that property possessed by cocoanut-oil of not solidifying itself en masse and homogeneously, but, on the contrary, of assuming several crystallizations, according to different degrees of temperature. Starting from this point and after having observed the different phases of crystallization I have ascertained that at the temperature of about 23° centigrade, the point of fusion of ordinary cocoanut-oil, one portion of this oil crystallizes in the middle of the mass, and that this portion, separated by pressure from the liquid portion, presents all the characteristics of stearin separated from its olein. The matter or product thus separated only melts at a temperature above 31° centigrade and only commences to congeal at a temperature of about 28° centigrade. It is therefore much more suitable than cocoanut-oil for alimentation, perfumery, pharmacy, and other purposes.

To prepare this product, I heat the cocoanut-oil to the melting-point. Then I allow it to crystallize at a constant temperature of about 23° centigrade during about forty-eight hours. In fact, the longer time allowed for crystallization the better the product. At the end of this time, the crystallization being perfectly formed, the whole is passed through presses similar to those employed in the manufacture of stearin and subjected to a very gentle pressure, not necessarily more than one hundred and fifty kilograms per square centimeter, thus obtaining dry and compact cakes representing about forty-five per cent. of the original mass. All that is further required is to remelt these cakes and purify them. The product having been purified it is poured into suitable molds to give it any desired form without its being necessary for its shipment to take any other precautions, whereas ordinary cocoa-butter can only be shipped in hermetically-closed cases.

The liquid oil extracted by pressure has not lost any of the qualities which render it useful for industrial purposes except that it contains almost all of the free fat acids which give to cocoanut and copra oil their peculiar odor—viz., the volatile or soluble fat acid glycerides, such as caproine, capryline, butyric acid, &c., glycerides which are much more apt to oxidize and become rancid than other glycerides and which gives birth to products of disagreeable odor and burning taste.

I will now proceed to describe the process for the purification of these products which constitutes my invention and by which both the expulsion of the insoluble fat acids and the expulsion of the soluble fat acids are effected. This process may be performed either before the extraction of the solid product from the cocoanut-oil or after its extraction. I prefer the last-mentioned mode of operation because it presents the advantage that the greater part of the free fat acids and soluble glycerides being passed into the liquid portion the work of purification is very much simplified.

To expel the insoluble fat acids, different means have been tried with more or less success. That which has been found generally applicable has been a base such as calcined magnesia or lime in a state of powder. The lime presents great advantages as much from an economical point of view (rapidity of work and cheapness) as in view of the result, which is much more complete than that with any other base; but its use has been up to the present time almost impossible, because, especially with oils of low quality containing a large quantity of fat acids, it forms a very hydrated emulsion or magma, which it is almost impossible to separate by the filter-press, and though after some time and by the employment of great pressure a separation may be arrived at it is never complete, and the cakes of lime contain a considerable quantity of oil the loss of which renders objectionable the employment of lime. The separation of the lime could only be arrived at by a prolonged boiling; but besides the risk which is thus encountered of changing the quality of the oil by heat there is communicated to it a burned taste as disagreeable in its way as that of the fat acids. It may be seen, therefore, that although lime is the most energetic agent for the removal of the fat acids it presents the inconvenience of producing this emulsion or magma, which it has been almost impossible to get rid of. Now I have ascertained that the addition of water is indispensable to the operation of neutralization which determines this emulsion. I have then sought to eliminate this water in a radical fashion without raising the temperature, and I arrive at this result in the following manner:

After having treated by lime either the product or the cocoanut-oil, according to the order adopted for these operations and after having sufficiently kneaded it, I introduce the mixture into a vacuum evaporating-pan such as is employed in a sugar-refinery, with the difference that the apparatus is furnished with an agitator and that I preferably heat it externally.

When the vacuum is established, the evaporation is produced very rapidly, starting at the low temperature of from 20° or 25° centigrade. The operation may be completed at these temperatures, but to render the operation more active may be raised to such a degree as is known not to be likely to damage the oil, but never raised to the degree at which water boils under atmospheric pressure.

The water is evaporated methodically to such a point that after a very short time lime soap is formed in small granules and falls to the bottom of the apparatus by separating itself completely from the oil. If the operation is continued to complete dryness, the lime soap separates itself and is precipitated in the form of sediment. The separation is then so complete that it is not necessary to pass the oil through the filter-press, but in practice I prefer to stop the evaporation when the lime commences to crystallize in small grains and then to proceed with the filtration. All that remains to be afterward done is to extract the salts of the fat acids, for which purpose any of the known processes may be employed.

The proportion of lime to be used in carrying out my invention may be varied from twenty-five to thirty parts, by weight, of lime for every one hundred parts of the amount of fat acids detected by chemical analysis in the oil or product to be treated.

What I claim as my invention is—

The within-described method of purifying cocoanut-oil and its crystalline product of their contained fat acids, consisting in first heating said oil or product to the melting-point, next adding lime and water thereto to produce an emulsion and afterward subjecting this emulsion to evaporation and agitation *in vacuo* at a low temperature whereby the water is expelled and the lime and the fat acids are caused to be precipitated in the form of lime soap, substantially as described.

In witness whereof I have hereunto set my hand in the presence of two subscribing witnesses.

MARIE CHARLES ALFRED RUFFIN.

Witnesses:
HENRY THIESSE,
CLYDE SHROPSHIRE.